US007996786B2

(12) United States Patent  
MacLaurin et al.

(10) Patent No.: US 7,996,786 B2  
(45) Date of Patent: Aug. 9, 2011

(54) DYNAMICALLY RENDERING VISUALIZATIONS OF DATA SETS

(75) Inventors: Matthew MacLaurin, Woodinville, WA (US); Michael Miller, Sammamish, WA (US); Andrzej Turski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 11/682,157

(22) Filed: Mar. 5, 2007

(65) Prior Publication Data

US 2008/0222570 A1     Sep. 11, 2008

(51) Int. Cl.  
*G06F 3/048* (2006.01)

(52) U.S. Cl. ........................................ 715/788; 715/764

(58) Field of Classification Search .................. 715/764, 715/788  
See application file for complete search history.

(56) References Cited

U.S. PATENT DOCUMENTS

| | | | |
|---|---|---|---|
| 6,628,312 B1 | 9/2003 | Rao et al. | |
| 6,961,731 B2 | 11/2005 | Holbrook | |
| 6,972,763 B1 | 12/2005 | Millett et al. | |
| 6,995,768 B2 | 2/2006 | Jou et al. | |
| 7,038,680 B2 | 5/2006 | Pitkow | |
| 7,057,612 B2 | 6/2006 | Balfour | |
| 7,071,940 B2 | 7/2006 | Malik | |
| 7,412,534 B2 * | 8/2008 | Tsang et al. | 709/231 |
| 2003/0144868 A1 | 7/2003 | MacIntyre et al. | |
| 2004/0183800 A1 | 9/2004 | Peterson | |
| 2005/0012743 A1 | 1/2005 | Kapler et al. | |
| 2005/0060667 A1 | 3/2005 | Robbins | |
| 2006/0195442 A1 * | 8/2006 | Cone et al. | 707/5 |
| 2007/0174790 A1 * | 7/2007 | Jing et al. | 715/838 |
| 2007/0271297 A1 * | 11/2007 | Jaffe et al. | 707/104.1 |
| 2008/0052372 A1 * | 2/2008 | Weber et al. | 709/217 |
| 2008/0071929 A1 * | 3/2008 | Motte et al. | 709/246 |
| 2008/0154878 A1 * | 6/2008 | Rose et al. | 707/5 |

FOREIGN PATENT DOCUMENTS

JP     12-200284     7/2000

OTHER PUBLICATIONS

Deborah F. Swayne, Dianne Cook and Andreas Buja, "XGobi: Interactive Dynamic Data Visualization in the X Window System," AT&T Labs—Research, 180 Park Ave, P.O. Box 971, Florham Park, NJ 07932-0971, www.research.att.com, Department of Statistics, 323 Snedecor Hall, Iowa State University, Ames, IA 50011, Mar. 5, 1998.

(Continued)

*Primary Examiner* — Ashraf Zahr  
(74) *Attorney, Agent, or Firm* — Shook Hardy & Bacon LLP

(57) ABSTRACT

Computerized methods and systems for dynamically rendering visual representations of data sets are provided. Upon receiving a request for a particular data set (for instance, in response to receiving a search request), a data set is identified and a minimum portion thereof is retrieved that is necessary to render a visual representation of the data set. In this regard, items sharing a common characteristic may be grouped with one another so that only a single visual identifier of a group of data items may be displayed. In this way, a larger portion of the entire data set may be represented in a single view.

17 Claims, 7 Drawing Sheets

OTHER PUBLICATIONS

Cemal Kose, Alan Chalmers, "Dynamic Data Management for Parallel Volume Visualisation," Department of Computer Science, University of Bristol, Bristol, United Kingdom, kose@compsci.bristol.ac.uk, alan@compsci.bristol.ac.uk.

Mark Derthick, John Kolojejchick and Steven F. Roth, "An Interactive Visualization Environment for Data Exploration," Carnegie Mellon University, School of Computer Science, Pittsburgh, PA 15213, {mad+, jake+, roth+}@cs.cmu.edu, Proceedings of Knowledge Discovery in Databases, AAAI Press, Aug. 1997, pp. 2-9.

International Search Report and Written Opinion, International Application PCT/US2008/055764 filed Mar. 4, 2008, mailed Jul. 17, 2008, 10 pages.

* cited by examiner

DYNAMICALLY RENDERING VISUALIZATIONS OF DATA SETS

BACKGROUND

Displaying large amounts of data (for instance, results of a search query) for interactive view is an increasingly common problem. Many existing solutions display a fixed number of results (or data items) on a single page such that a user may have to scroll or page through hundreds, if not thousands, of result pages in order to get a feel for the scope and breadth of the returned results. Obviously, often a user will not take the time to do this and, accordingly, may leave their search experience dissatisfied.

Further, these types of display systems must function in a heterogeneous environment, integrating data sources with a wide variety of performance characteristics. For instance, in order to provide comprehensive results, these types of display systems may retrieve data from various data sources (e.g., a local hard drive, a shared server, the Internet, etc.), each source varying in its performance characteristics and capacity.

Still further, different types of data items (e.g., text files, emails, meeting requests, photographs, etc.) may have differing ideal presentations. That is, it may be desirable for a photograph to be displayed as a thumbnail and an email displayed as an envelope-like icon such that upon quick glance, the user can get an idea of result type.

Many current systems do not scale well and become unresponsive when displaying large data sets. Others scale to large data sets but do so at the expense of visual richness or display flexibility. Systems often achieve scalability by assuming all data items will be displayed sequentially (none will be hidden) and that all data items will be exactly the same size. Such assumptions are, at best, inaccurate in practical application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable media for dynamically rendering visual representations of a data set. Upon receiving a request for a particular data set (for instance, in response to receiving a search request), a resultant data set to be displayed is identified and a minimum portion thereof is retrieved that is determined to be necessary to render a visual representation of the data set. In this regard, items sharing a common characteristic may be grouped with one another so that only a single visual identifier of a group of data items may be displayed. In this way, a larger portion of the entire data set may be represented in a single view without losing visual richness.

BRIEF DESCRIPTION OF THE DRAWINGS

The present invention is described in detail below with reference to the attached drawing figures, wherein.

DETAILED DESCRIPTION

Figure 1:
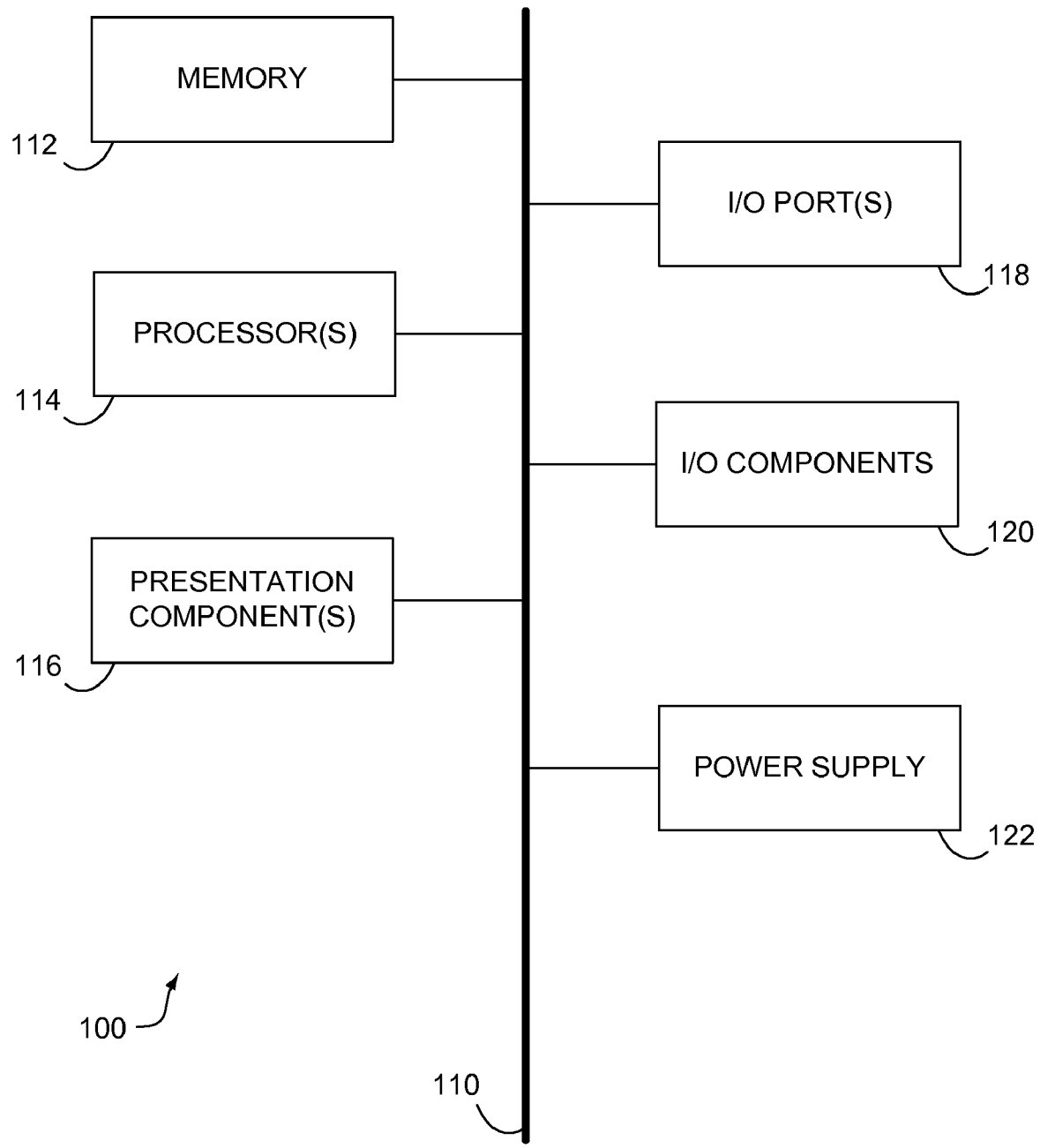
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computerized methods and systems, and computer readable media having computer-executable instructions embodied thereon, for dynamically rendering visual representations of data sets. Upon receiving a request for a particular data set (for instance, in response to receiving a search request), a resultant data set is identified and a minimum portion thereof is received that is necessary to render a visual representation of the data set. In this regard, items sharing a common characteristic may be grouped with one another so that only a single visual identifier of a group of data items may be displayed. In this way, a larger portion of the entire data set may be represented in a single view without the expense of losing visual richness.

Accordingly, in one aspect, the present invention provides one or more computer-readable media having computer-executable instructions embodied thereon that, when executed, perform a method for dynamically rendering a visual representation of a data set. The method includes receiving data associated with a plurality of data items from at least one data source; organizing the received data items in accordance with at least one criterion; selecting a visual identifier for each of the plurality of data items; estimating, based upon the selected visual identifiers, at least a portion of the plurality of data items that is capable of concurrent visual display; retrieving a minimum portion of the received data associated with the plurality of data items that is necessary to render the visual representation of the dataset, the visual representation including the visual identifiers associated with each data item comprising the estimated portion of the plurality of data items; and rendering the visual representation of the data set.

In another aspect of the present invention, a computer system is provided for dynamically rendering a visual representation of a data set. The computer system includes a data receiving module, a display manager, a data retrieval manager, and a compound data display. The data receiving module is configured to receive data associated with a plurality of data items. The display manager is configured to estimate at least a portion of the plurality of data items capable of concurrent visual display. The data retrieval manager is configured to retrieve a minimum portion of the received data associated with the plurality of data items that is necessary to render the visual representation of the data set, the visual representation including a visual identifier associated with each of the at least a portion of the plurality of data items capable of concurrent visual display. The compound data display module is configured to render the visual representation of the data set.

A further aspect of the present invention provides a computerized method for rendering a visual representation of a data set. The method includes receiving data associated with a plurality of data items from at least two data sources, organizing the received data items into a plurality of groups based upon at least one property thereof, selecting a visual identifier for each of the plurality of groups, estimating at least a portion of the visual identifiers that are capable of concurrent visual display, retrieving a minimum portion of the received data associated with the plurality of data items that is necessary to render the at least a portion of the visual identifiers that are capable of concurrent visual display, and rendering the at least a portion of the visual identifiers that are capable of concurrent visual display as the visual representation of the data set.

Having briefly described an overview of embodiments of the present invention, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
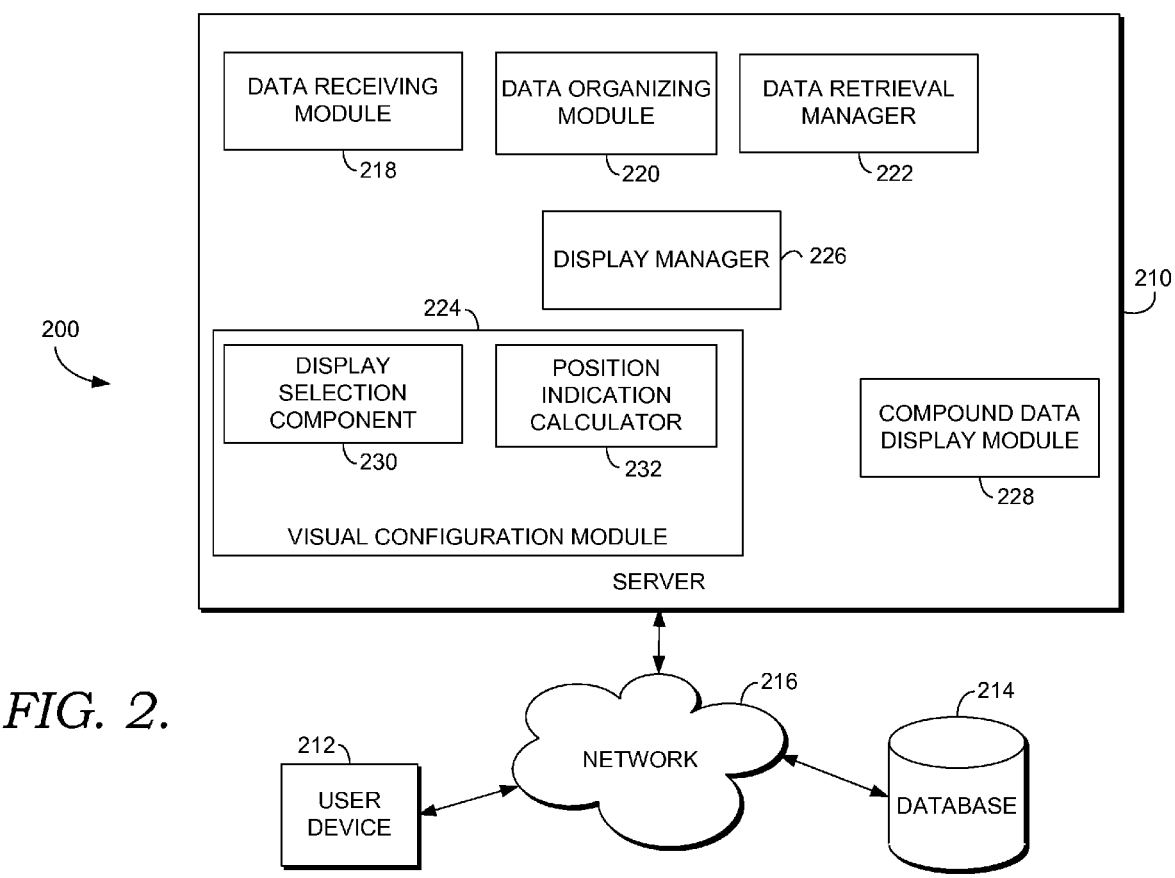
FIG. 2 is a block diagram of an exemplary computing system configured to dynamically render a visual representation of a data set, in accordance with an embodiment of the present invention.

Turning now to FIG. 2, a block diagram is illustrated that shows an exemplary computing system 200 configured to dynamically render a visual representation of a data set, in accordance with an embodiment of the present invention. It will be understood and appreciated by those of ordinary skill in the art that the computing system 200 shown in FIG. 2 is merely an example of one suitable computing environment and is not intended to suggest any limitation as to the scope of use or functionality of the present invention. Neither should the computing system 200 be interpreted as having any dependency or requirement related to any single component/module or combination of components/modules illustrated therein.

Computing system 200 includes a server 210, a user device 212, and a database 214, all in communication with one another via a network 216. The network 216 may include, without limitation, one or more local area networks (LANs) and/or wide area networks (WANs). Such networking environments are commonplace in offices, enterprise-wide computer networks, intranets, and the Internet. Accordingly, the network 216 is not further described herein.

The database 214 is configured to store information associated with at least one data set. In embodiments, such information may include, without limitation, individual data items, groupings of data items, available display icons, thumbnails, etc. for representing data items and/or groups of data items, user display preferences, and the like. It will be understood and appreciated by those of ordinary skill in the art that the information stored in the database 214 may be configurable and may include any information relevant to a data item, i.e., an item of information, and/or sets thereof. The content and volume of such information are not intended to limit the scope of embodiments of the present invention in any way. Further, though illustrated as a single, independent component, database 214 may, in fact, be a plurality of databases, for instance, a database cluster, portions of which may reside on a computing device associated with the server 210, the user device 212, another external computing device (not shown), and/or any combination thereof.

Each of the server 210 and the user device 212 shown in FIG. 2 may be any type of computing device, such as, for example, computing device 100 described above with reference to FIG. 1. By way of example only and not limitation, the server 210 and/or the user device 212 may be a personal computer, desktop computer, laptop computer, handheld device, mobile handset, consumer electronic device, and the like. It should be noted, however, that the present invention is not limited to implementation on such computing devices, but may be implemented on any of a variety of different types of computing devices within the scope of embodiments hereof.

As shown in FIG. 2, the server 210 includes a data receiving module 218, a data organizing module 220, a data retrieval manager 222, a visual configuration module 224, a display manager 226, and a compound data display module 228. In some embodiments, one or more of the illustrated components/modules may be implemented as stand-alone applications. In other embodiments, one or more of the illustrated components/modules may be integrated directly into the operating system of the server 210 and/or the user device 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments of the present invention.

The data receiving module 218 is configured to receive data associated with a plurality of data items. Such data may include, without limitation, a data item itself (e.g., a photograph, video, email, meeting request, text document, web site identifier, and the like) and any property or characteristic associated with a data item (e.g., date created, author, data type, data source, etc.). Additionally, the data receiving module 218 is configured to receive requests for data items, for instance, search queries, storage location addresses, and the like. In this regard, the data receiving module 218 is further configured to forward (e.g., via network 216) received requests to one or more data sources (e.g., a local hard drive, storage location associated with the user device 212, database 214, etc.) and to incrementally receive data items from the various data sources in response thereto. Incremental receipt of the data items aids in optimizing RAM and processing resources, particularly when searching high latency data.

The data organizing module 220 is configured to organize data items received by the data receiving module 218 in accordance with at least one criterion. For instance, the data organizing module 220 may organize data items according to date created, data source, author, data type, size of data item, alphabetical order, reverse alphabetical order, or the like. It will be understood by those of ordinary skill in the art that any property or characteristic associated with a data item may be utilized to organize such data item in accordance with embodiments of the present invention.

The data organizing module 220 is further configured to organize at least two of the plurality of received data items into one or more groups. The criteria for organizing data items into groups may be similar or identical to those indicated hereinabove. In one embodiment, data items may be organized into groups and/or sub-groups (i.e., groups within groups) based upon a first criterion (e.g., data source) and subsequently organized based upon a second criterion (e.g., alphabetical order) wherein the organization by the second criterion applies to the data items comprising the group or sub-group rather than to the data items comprising the data set as a whole. By way of example only and not limitation, in one embodiment, the data items comprising the data set may be grouped based upon data source (first criterion), wherein groupings exist for data items received from the local hard drive, the server, and the Internet. Subsequently, the data items within the grouping of data items received from the local hard drive may be alphabetically organized (second criterion) with respect to one another but wholly independent of those data items comprising the server and the Internet groupings. Where at least two data items are organized into a group, the visual identifier representing the data items may, in fact, comprise a visual identifier for the group, as more fully described below.

In embodiments, the data items received by the data receiving module 218 are buffered before being forwarded to the data organizing module 220 for organization. Such buffering aids in optimizing RAM and processing, network, and/or server resources.

The data retrieval manager 222 is configured to retrieve a minimum portion of the received data associated with the data items that is necessary to render a visual representation of the data set. That is, the data retrieval manager 222 determines what data to buffer and what data to pull into memory for visual representation. The visual representation includes a visual identifier (e.g., an icon, thumbnail, header, text blurb, or the like) associated with each of the plurality of data items, groups, and/or sub-groups that is capable of concurrent visual display.

The data retrieval manager 222 is further configured to retrieve an updated minimum portion of the received data associated with the plurality of data items that is necessary to render an updated visual representation of the data set, for instance, upon receipt of additional user input, as more fully described below. For instance, if a subsequent request for different or refined data items is received, the data retrieval manager 222 may determine which previous data items are to be purged and which new data items are to be added to the data set. In one embodiment, data items may be cached in association with the data retrieval manager 222 to optimize memory and processing resources. The updated visual representation may include the visual identifiers associated with each data item, group, and/or sub-group comprising the estimated updated portion of the plurality of data items.

As more fully described below with reference to FIGS. 4A, 4B, and 4C, the data retrieval manager 222 may be further configured to speculatively retrieve data in addition to the minimum data subsequent to expiration of an idle timeout period.

The visual configuration module 224 is configured to determine a spatial layout and configuration for the visual representation of the data set. The visual configuration module 224 shown in FIG. 2 includes a display selection component 230 and a position indication calculator 232. In some embodiments, one or more of the components 230 and 232 may be implemented as stand-alone applications. In other embodiments, one or more of the components 230 and 232 may be integrated directly into the operating system of the server 210 or the user device 212. It will be understood by those of ordinary skill in the art that the components 230 and 232 illustrated in FIG. 2 are exemplary in nature and in number and should not be construed as limiting. Any number of components may be employed to achieve the desired functionality within the scope of embodiments of the present invention.

The display selection component 230 is configured to select a visual identifier to be associated with each of the data items (which may include visual identifiers for groups and sub-groups of data items as well) of the estimated portion. Such visual identifiers may include, by way of example only, icons, thumbnails, headers, text blurbs, and the like. Such visual identifier selection may be based upon any number of criteria within the scope of embodiments hereof including, without limitation, predefined user preferences, default selections based upon a particular criterion, and the like. Any and all such variations, and any combination thereof, are contemplated to be within the scope of embodiments hereof.

The position indication calculator 232 is configured to calculate at least one of a size and a position of a data set position indicator based upon the estimated relative size. A position indicator may include, by way of example and not limitation, a scroll bar positioned to one side of a rectangular display area. The size of the thumb on the scroll bar may be indicative of the portion of the displayed data items relative to the overall data set and the position of the thumb may be indicative of a location within the overall data set at which the displayed items are located. Proportion representation and position calculation are more fully described herein below.

The display manager 226 is configured to estimate at least a portion of the data items (received by data receiving module 218) that are capable of concurrent visual display. Such estimation may take into account a number of factors including, but not limited to, the size of the user's display area, the size of the visual identifiers selected by the display selection component 230, the desired format for the data items (e.g., stacked, grouped, flat, etc.) and the like. The display manager 226 is further configured to estimate a size of the estimated portion of the plurality of data items relative to a size of the plurality of received data items. That is, the display manager 226 is configured to estimate what portion of an entire retrieved data set is consumed by the data items illustrated in one form or another (e.g., as a single data item, group, etc.) in association with the visible display area and to request this data from the data retrieval manager 222 for display. In embodiments, estimation may be based upon a combination of sampling and estimates. For instance, the display manager 226 may examine the first few items in a data set and estimate the visible data set based upon these items. The display manager 226 may also make predictions based upon input received from the display selection component (e.g., determining the data type of the data items estimated to comprise the visible data set).

In embodiments, the display manager 226 may also account for error and dynamically corrects previous estimations/predictions. For instance, as the user scrolls through displayed data items and the system gains a greater understanding of the nature of the data items comprising the data set (and as more information is received), the spatial layout of the visible display may be updated accordingly.

Still further, the display manager 226 is configured to determine if user input has been received subsequent to receiving the data associated with the plurality of data items. If it is determined that user input has been received subsequent to receiving the data associated with the plurality of data items, the display manager 226 is further configured to estimate at least an updated portion of the plurality of data items. Updating based upon subsequent user input is more fully described herein below.

The compound data display module 228 is configured to render the visual representation of the data set, for instance, in association with a user interface associated with user device 212. The compound data display module 228 is further configured to render an updated visual representation upon receipt of updated data items, as more fully described below.

Figure 3:
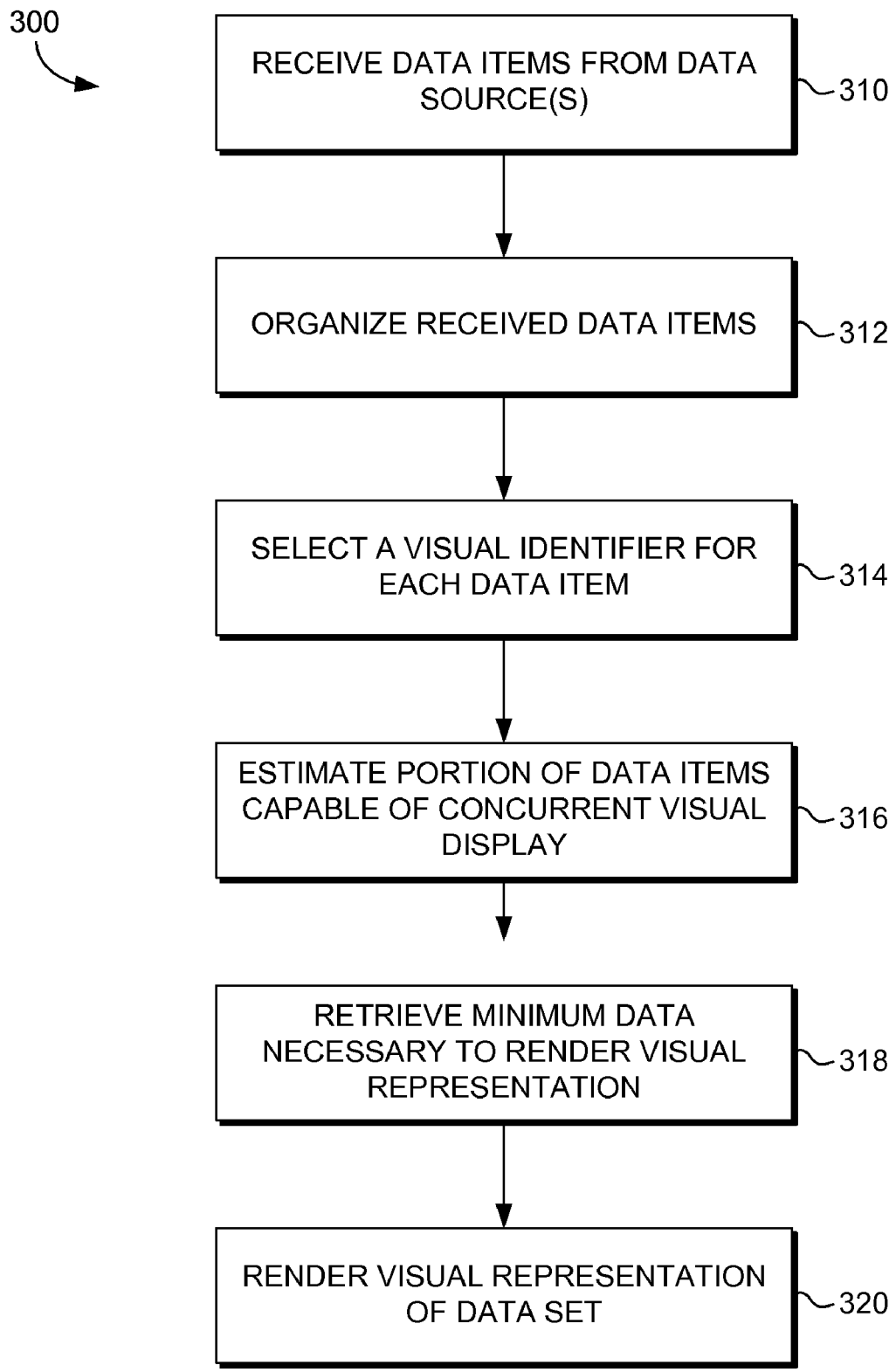
FIG. 3 is a flow diagram illustrating an exemplary method for dynamically rendering a visual representation of a data set, in accordance with an embodiment of the present invention.

Turning now to FIG. 3, a flow diagram is illustrated that shows a method 300 for dynamically rendering a visual representation of a data set, in accordance with an embodiment of the present invention. Initially, as indicated at block 310, data associated with a plurality of data items is received from at least one data source, e.g., via data receiving module 218 of FIG. 2). Once received, the data items are organized (e.g., collated), as indicated at block 312. Such organization may be performed, for instance, utilizing data organizing module 220 of FIG. 2. In one embodiment, such organization may include grouping at least a portion of the data items into one or more groups based upon a common property or characteristic thereof. For instance, the data items may be grouped based upon the data type (e.g., email, photo, etc.), the data source (e.g., database associated with the server, database associated with the hard drive of a user's computing device, data received from the Internet, etc.), the author of the data item, the date the data item was created, or the like. It will be understood and appreciated by those of ordinary skill in the art that embodiments of the present invention are not intended to be limited to those properties or characteristics listed herein. Any identifiable property or characteristic of a data item may be utilized to group the data item with other data items having a similar or identical property or characteristic within the scope of embodiments hereof.

Next, as indicated at block 314, a visual identifier for each data item is selected, for instance, utilizing display selection component 230 of FIG. 2. This is indicated at block 314. In embodiments, visual identifiers for grouped data items may be selected for the entire group as a whole for initial rendering, with selected visual identifiers for the data items included within the group being displayed, for instance, upon user indication to expand the group. By grouping data items and displaying only a visual identifier for the group rather than visual identifiers for each of the individual data items, more information about the returned data set may be displayed within a single view. Additionally, a visual representation of the data set may be displayed more quickly than if all data items are individually displayed as less information (for instance, an item count) may be sufficient for rendering the group visual identifier than would be required to render individual representations for the data items.

Next, a portion of the data items that are capable of concurrent visual display is estimated (e.g., utilizing display manager 226 of FIG. 2), as indicated at block 316. That is, based upon the selected visual identifiers for the data items/groups, the proportion of visual identifiers that may be displayed within a single view is estimated relative to the data items comprising the entire data set. Such estimation may be based on a number of factors including, but not limited to, the dimensions of the user's display surface (e.g., computer monitor), the size of the selected visual identifiers, the format of the items (e.g., stacked, grouped, flat, etc.) and the like.

Once the portion of data items capable of concurrent visual display is estimated, the minimum data necessary to render a visual representation of the data set, that is, the minimum data necessary to render the visual identifiers for those data items/groups that are estimated to be capable of concurrent visual display, is retrieved. This is indicated at block 318. Such data retrieval may be performed, for instance, utilizing data retrieval manager 222 of FIG. 2. Subsequently, as indicated at block 320, a visual representation of the data set is rendered, for instance, utilizing compound data display module 228 of FIG. 2.

It will be understood and appreciated by those of ordinary skill in the art that when a large data set is retrieved, it is likely that even utilizing data item grouping techniques, not all data items will be capable of being represented concurrently. Accordingly, a position indicator (e.g., a scroll bar) may be displayed in association with the visual representation to provide the user with an indication of the size of the displayed data items/groups relative to the size of the entire data set and/or the position of the displayed data items/groups within the data set as a whole. Such functionality was more fully described hereinabove with reference to position indication calculator 232 of FIG. 2.

Figure 4A:
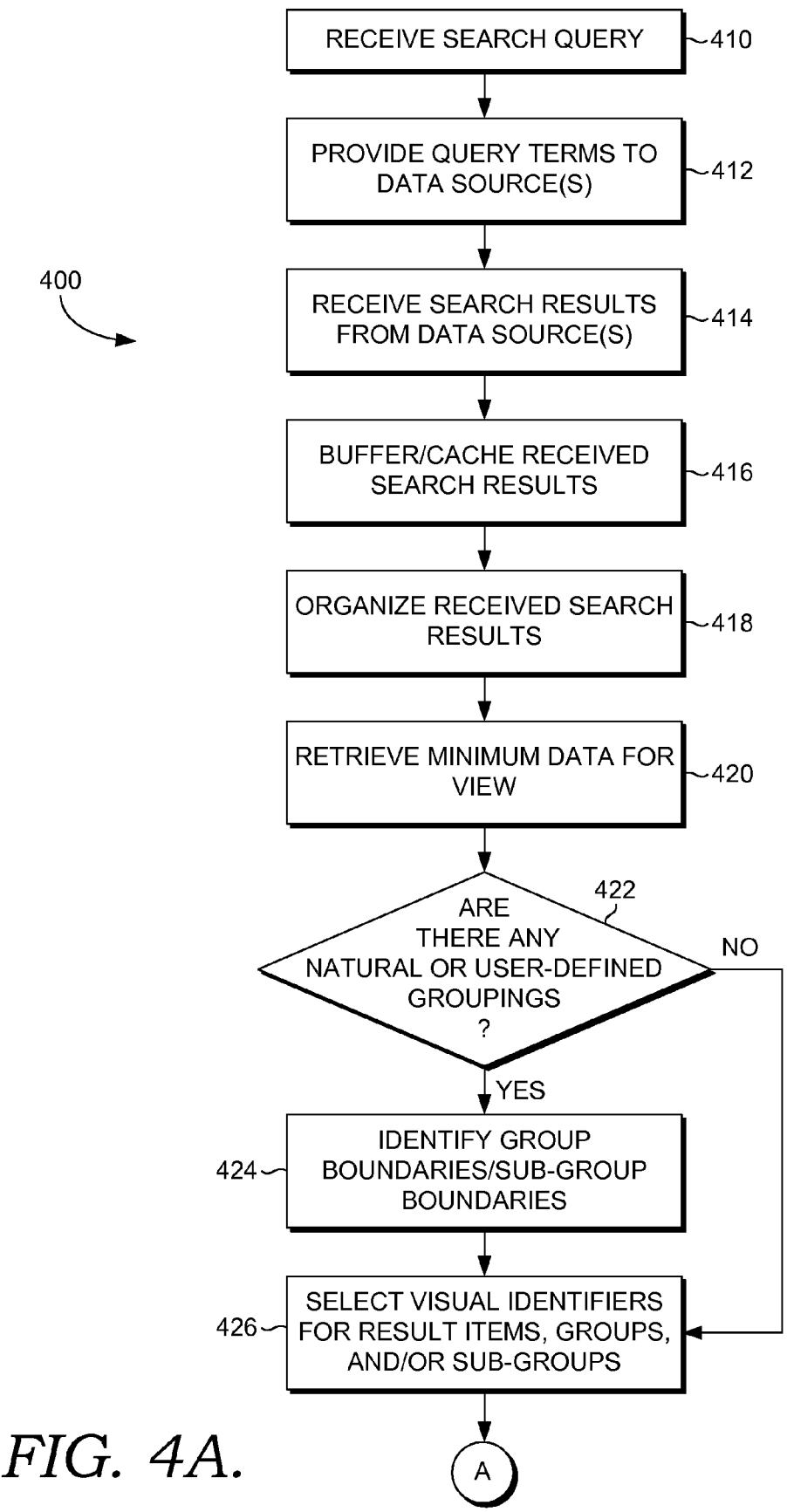
FIGS. 4A, 4B, and 4C are a flow diagram illustrating a method for rendering a visual representation of a plurality of result items received in response to a search query, in accordance with an embodiment of the present invention.
Figure 4B:
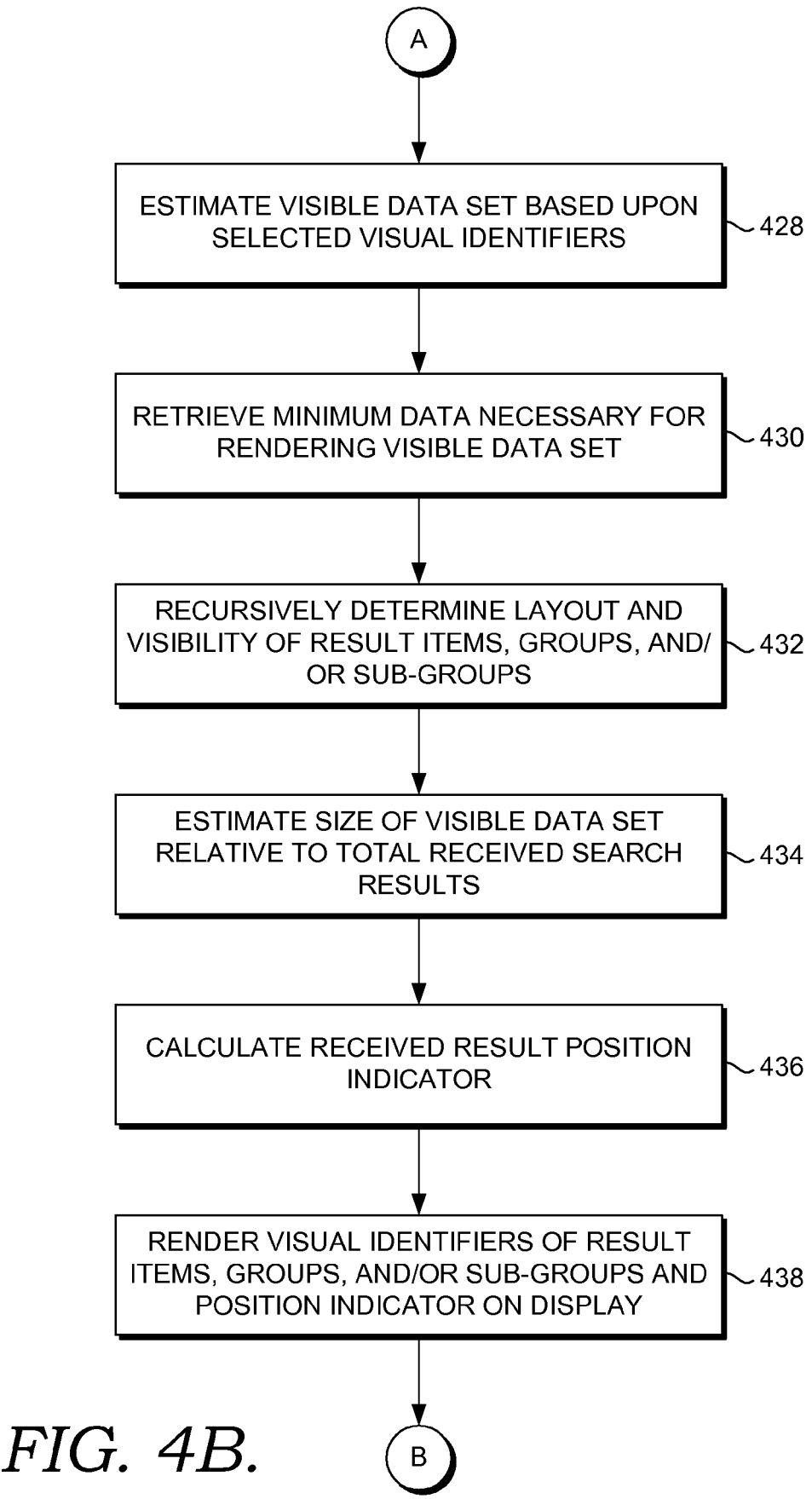
Figure 4C:
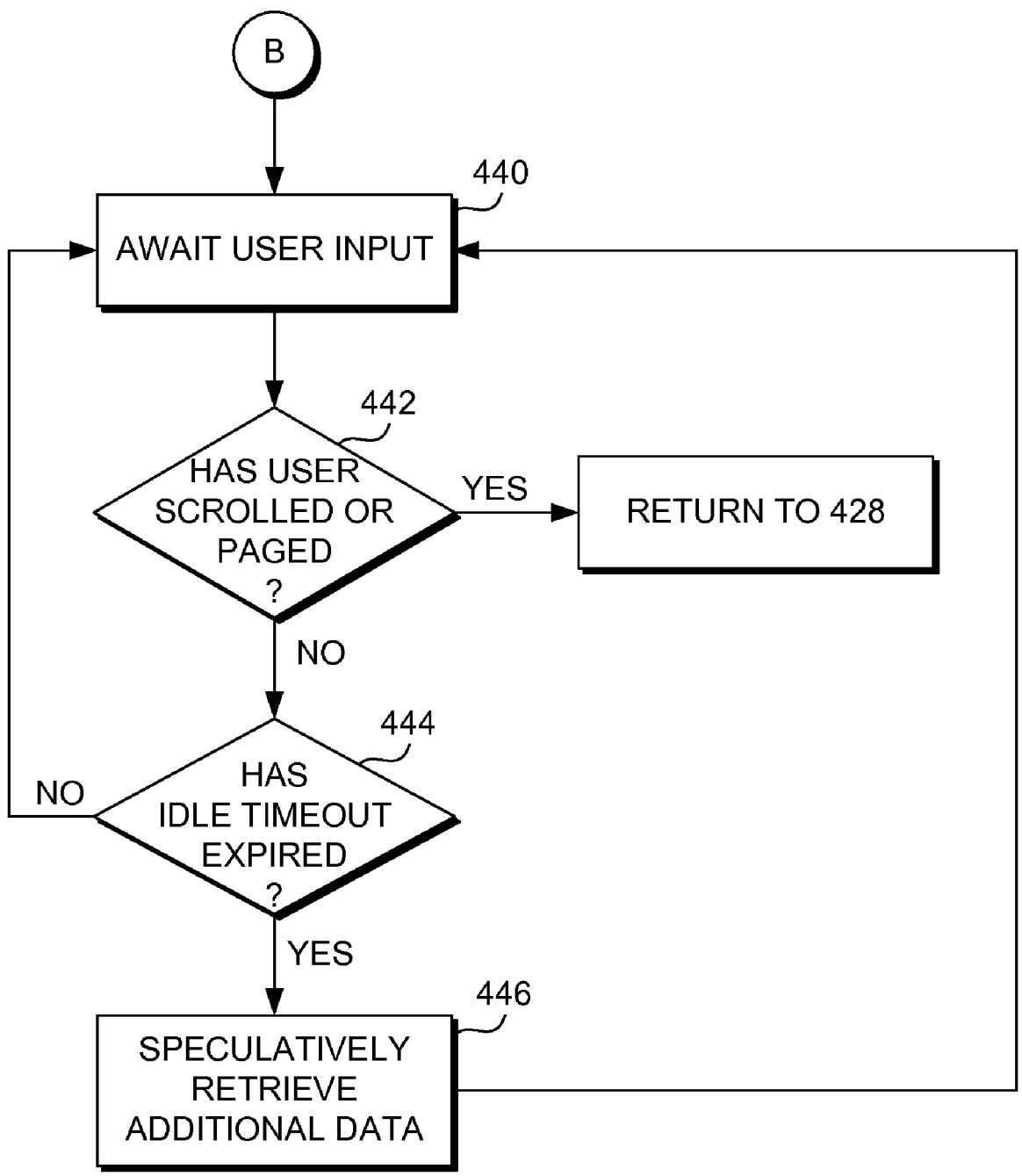

With reference now to FIGS. 4A, 4B, and 4C, a flow diagram 400 is illustrated showing a method for rendering a visual representation of a plurality of result items received in response to a search query, in accordance with an embodiment of the present invention. It will be understood and appreciated by those of ordinary skill in the art that a search query is one common method by which a large set of data items may be received and represented to a user. Thus, as initially indicated at block 410, a search query is received, e.g., utilizing data receiving module 218. The terms comprising the search query are subsequently provided (for instance, via network 216) to one or more data sources, as indicated at block 412. In one embodiment, a plurality of data sources (for instance, a local computing device hard drive, a server, a remote database (e.g., database 214), the Internet, etc.) is queried. Search results are subsequently received incrementally from each of the queried data sources, as indicated at block 414.

Next, as indicated at block 416, the received search results are buffered or cached to limit strain on the memory and/or processing power of the rendering device. As indicated at block 418, the received results are subsequently organized based upon at least one common property or characteristic of the result items, e.g., utilizing data organizing module 220 of FIG. 2. For instance, in one embodiment, at least a portion of the result items may be organized into one or more groups based upon the data type (e.g., email, photo, etc.), the data source (e.g., database associated with the server, database associated with the hard drive of a user's computing device, data received from the Internet, etc.), the author of the result item, the date the result item was created, or the like. It will be understood and appreciated by those of ordinary skill in the art that any identifiable property or characteristic of a result item may be utilized to group the result item with other result items having a similar or identical property or characteristic within the scope of embodiments hereof.

In the interest of rendering an accurate display representing the data set as quickly as possible, the minimum data determined to be necessary to render a single view is subsequently retrieved, e.g., utilizing data retrieval manager 222 of FIG. 2, as indicated at block 420. In embodiments (not shown), this data may be utilized to render a visual representation of the data set, for instance, utilizing the compound data display module 228 of FIG. 2. In other embodiments (as shown in FIGS. 4A, 4B, and 4C) this data may be cached or buffered with further processing steps taking place prior to rendering.

As indicated at block 422, it is subsequently determined whether there are any natural or user-defined groupings that may be applied to the result items. Natural groupings may include, by way of example only, result type, data source, result item author, and the like. User-defined groupings may similarly include, for instance, result type, data source, result item author, and the like, and represent characteristics and/or properties by which the user has specified s/he would like the result items grouped. If it is determined that there are groupings that may be applied to the result items, the group boundaries (and sub-group boundaries, if applicable) are subsequently identified, as indicated at block 424, and the items grouped accordingly (for instance, utilizing data organizing module 220 of FIG. 2). Subsequently, or if it is determined at block 422 that there are no natural or user-defined groupings which may be applied to the result items, visual identifiers for the result items, groups, and/or sub-groups are selected. This is indicated at block 426.

Next, as indicated at block 428 of FIG. 4B, a visible data set (that is, a set of result items that is capable of concurrent display) is estimated utilizing the selected visual identifiers. It will be understood that other factors including, without limitation, the size of the available display area and the format of the result items (e.g., stacked, grouped, flat, and the like), may be utilized in estimating the visible data set as well. Next, as indicated at block 430, the minimum data necessary for rendering the visible data set is retrieved and the layout and visibility of result items, groups, and/or sub-groups is recursively determined (for instance, utilizing visual configuration module 224 of FIG. 2), as indicated at block 432.

Subsequently, the size of the visible data set relative to the size of all received result items is estimated (e.g., utilizing display manager 226 of FIG. 2), as indicated at block 434. For instance, if 100,000 result items were received (at block 414 of FIG. 4A) and it is estimated that the visible data set includes 20,000 result items, one way of estimating relative size would be to conclude that the visible data set comprises 20% of the received result items. However, this simplistic analysis assumes that all of the result items are approximately the same size, an assumption that is somewhat unrealistic in practical application. Accordingly, embodiments of the present invention estimate relative size utilizing additional information including, but not limited to, the size of the individual result items and the format in which they are represented. Any and all such variations, and any combination thereof, are contemplated to be within the scope of embodiments hereof.

Once the estimated relative size is determined, a received result position indicator is calculated (e.g., utilizing position indication calculator 232 of FIG. 2), as indicated at block 436. For instance, the received result position indicator may comprise a scroll bar that will be displayed on one edge of the display area upon rendering. In other embodiments, the received result position indicator may utilize an index, table of contents, or other data organization mechanism. Referring back to the above example, if it is determined that the estimated relative size of the visible data set comprises 20% of the received result items, the scroll bar may include a thumb that encompasses 20% of the edge of the display area. Additionally, the position of the thumb relative to the display area may be indicative of the position of the visible data set within the data set. That is, if it is the first 20% of the result items that are being visual represented in the visible data set, the thumb will not only encompass 20% of the edge of the display area but will also be positioned, for instance, at the top of the edge.

Next, visual identifiers of the result items, groups, and/or sub-groups comprising the visible data set and the position indicator are rendered on the display surface (e.g., computer monitor), for instance, utilizing compound data display module 228 of FIG. 2. This is indicated at block 438. For instance, icons, thumbnails, headers, text blurbs, and the like that are visual identifiers of the result items, groups, and/or sub-groups comprising the visible data set and the position indicator (e.g., scroll bar) are rendered on the display surface.

With reference to FIG. 4C, the system subsequently awaits user input, as indicated at block 440. The user may, for instance, select a particular displayed visual identifier which may cause a group icon to disappear in favor of a plurality of sub-group icons, may cause a sub-group icon to disappear in favor of a plurality of result item visual indicators, may cause a result item visual indicator to disappear in favor of the result item represented thereby, and the like. If the user does not locate the desired result within the visible display area, s/he may scroll or page to a different location within the overall data set, as indicated at block 442. If it is determined at block 442, that the user has scrolled or paged indicating s/he would like to view a different subset of items within the overall data set, the method returns to the step indicated at block 428 of FIG. 4B and a new view is estimated and rendered.

If, however, it is determined at block 442 that the user has not scrolled or paged to a different location within the data set, and the user has not taken any other action, such as selection of a result item, sub-group, or group visual indicator, it is next determined whether an idle timeout has expired. This is indicated at block 444. That is, after a pre-determined period of time (i.e., the idle timeout period), if it is determined that the user has not taken any action with respect to the displayed visible data set, the system may speculatively retrieve additional data in anticipation of what the user may do next. This is indicated at block 446. Experience may indicate, for instance, that users who sit idle on a particular visible data set for a pre-determined period of time most often will, after a little longer period of time, scroll or page to the next subsequent subset of data items. In this example, the system may, at the expiration of the idle period, begin to retrieve the data necessary to render the subsequent subset of data items as a visible data set in anticipation of this action. It will be understood and appreciated by those of ordinary skill in the art that this is but one example and that the system may be configured to retrieve additional data in any way related to the result items comprising the overall data set within embodiments hereof. It should be noted that if the user takes further action other than the anticipated action during the period of speculative data retrieval, the data retrieval may be aborted in favor of the user's desired action.

Figure 5:
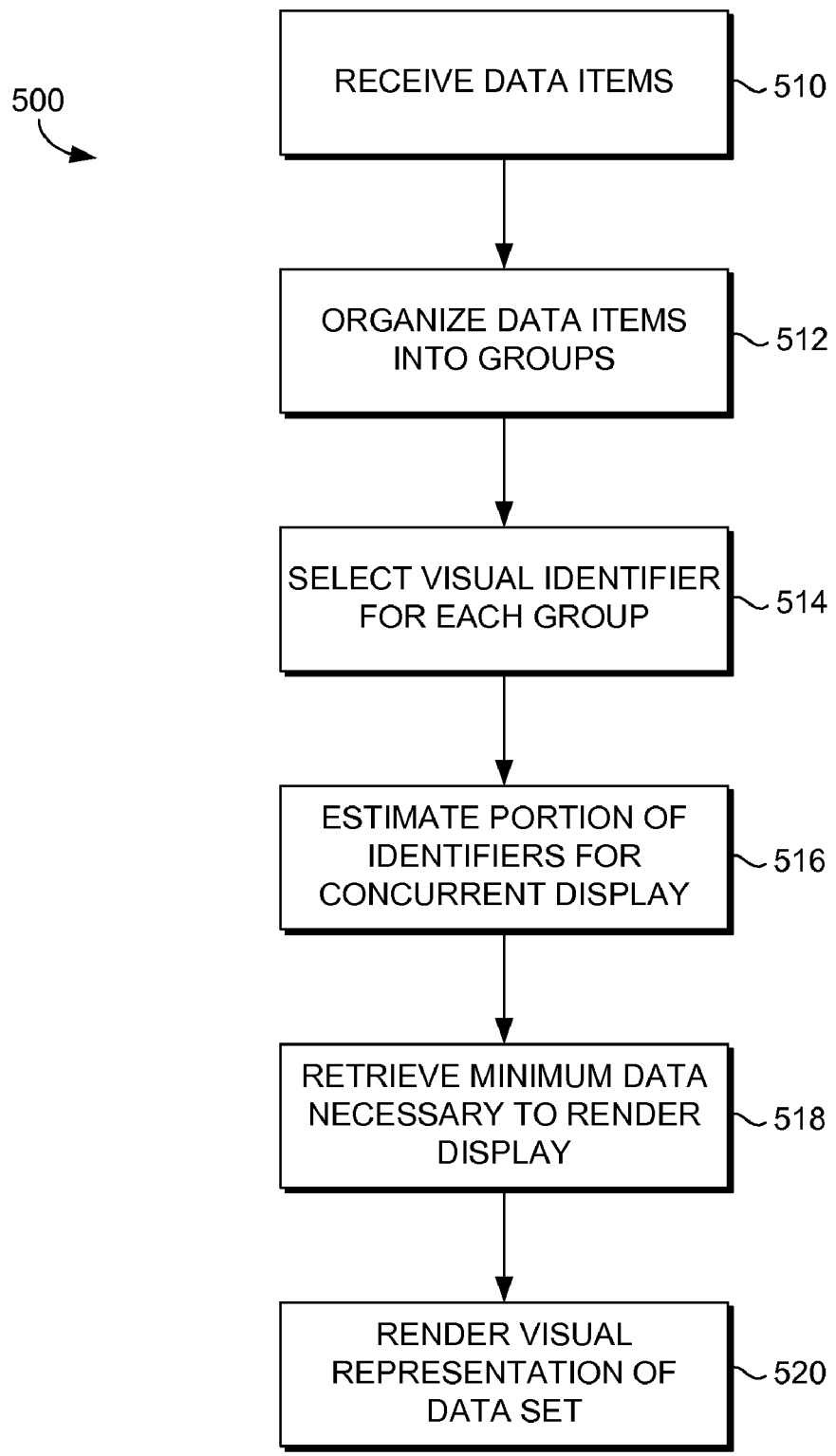
FIG. 5 is a flow diagram, in accordance with an embodiment of the present invention, illustrating a method for rendering a visual representation of a data set wherein at least a portion of the data items in the data set are organized into groups.

Turning now to FIG. 5, a flow diagram is illustrated showing a method for rendering a visual representation of a data set, wherein the data items are organized into groups, in accordance with an embodiment of the present invention. By grouping data items and displaying visual identifiers for each group or sub-group rather than visual identifiers for each of the individual data items, more information about a data set may be displayed within a single view. Additionally, a visual representation of the data set may be displayed more quickly than if all individual data items are individually displayed as less information may be sufficient for rendering the group visual identifier than would be required to render individual representations for the data items or the data items themselves. Still further, visual richness is not jeopardized to aid users in locating desired information more quickly.

Initially, as indicated at block 510, data associated with a plurality of data items is received from at least one data source, e.g., via data receiving module 218 of FIG. 2. Once received, the data items are organized into groups and/or sub-groups, as indicated at block 512. Groups may be based upon natural group boundaries (for instance, data type, data source, date, author, etc.), user-defined groupings, or any combination thereof. Such grouping may be performed, for instance, utilizing data organizing module 220 of FIG. 2.

Subsequently, a visual identifier for each ungrouped data item, group, and sub-group is selected, for instance, utilizing display selection component 230 of FIG. 2. This is indicated at block 514. As previously described, visual identifiers may include thumbnails, icons, text blurbs, headers, and the like (or any combination thereof) within the scope of embodiments hereof.

Next, a portion of the visual identifiers that is capable of concurrent visual display is estimated (e.g., utilizing display manager 226 of FIG. 2), as indicated at block 516. That is, based upon the selected visual identifiers for the groups, sub-groups, and/or ungrouped data items, the proportion of visual identifiers that may be displayed within a single view is estimated relative to the data items comprising the entire data set. Such estimation may be based on a number of factors including, but not limited to, the dimensions of the user's display surface, the size of the selected visual identifiers, the format of the dat items (e.g., stacked, grouped, flat, etc.) and the like.

Once the portion of visual identifiers capable of concurrent visual display is estimated, the minimum data necessary to render a visual representation of the data set, that is, the minimum data necessary to render the visual identifiers for those data items/groups/sub-groups that are estimated to be capable of concurrent visual display, is retrieved (for instance, utilizing data retrieval manager 222 of FIG. 2). This is indicated at block 518. Subsequently, as indicated at block 520, a visual representation of the data set is rendered, for instance, utilizing compound data display module 228 of FIG. 2.

As can be understood, embodiments of the present invention provide computerized methods and systems, and computer-readable media having computer-executable instructions embodied thereon, for dynamically rendering visual representations of data sets. Upon receiving a request for a particular data set (for instance, in response to receiving a search request), the data set is identified and a minimum portion thereof is retrieved that is necessary to render a visual representation of the data set. In this regard, items sharing a common characteristic may be grouped with one another so that only a single visual identifier of a group of data items may be displayed. In this way, a larger portion of the entire data set may be represented in a single view.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media having computer-executable instructions embodied thereon that, when executed, perform a method for dynamically rendering a visual representation of a data set, the method comprising:
    receiving data associated with a plurality of data items from at least one data source;
    organizing the received data items into groups in accordance with at least one criterion;
    assigning a common visual identifier to members of the groups, respectively;
    determining a spatial layout of the members of the groups within the display area;

selecting a format of the visual identifier assigned to each of the members of the groups, respectively;

estimating, based upon the selected visual identifiers, at least a portion of the plurality of data items that is capable of concurrent visual display by way of an estimation process comprising:
(a) determining a size of a display area; and
(b) estimating the portion of the plurality of data items capable of concurrent visual display based upon a combination of the spatial layout, the visual-identifier format associated with the groups, respectively, and the size of the display area;

retrieving a minimum portion of the received data necessary to render the visual representation of the data set; and rendering the visual representation of the data set.

2. The one or more computer-storage media of claim 1, wherein receiving data associated with a plurality of data items from at least one data source comprises receiving data associated with a plurality of search result items from at least a first data source and a second data source in response to a search query.

3. The one or more computer-storage media of claim 2, wherein organizing the received data items in accordance with at least one criterion comprises collating at least one search result item received from the first data source and at least one search result item received from the second data source, wherein the first and second data sources represent desperate physical locations that each store one or more of the received data items.

4. The one or more computer-storage media of claim 1, wherein organizing the received data items in accordance with at least one criterion comprises organizing the received data items in accordance with a data source from which each data item is received.

5. The one or more computer-storage media of claim 1, wherein the method further comprises:
estimating a size of the estimated portion of the plurality of data items relative to a size of the plurality of received data items, and
calculating at least one of a size and position of a data set position indicator based upon the estimated relative size.

6. The one or more computer-storage media of claim 5, wherein rendering the visible representation of the data set comprises rendering a visible representation of the data set and a visible representation of the data set position indicator.

7. The one or more computer-storage media of claim 1, further comprising determining if user input has been received subsequent to receiving the data associated with the plurality of data items.

8. The one or more computer-storage media of claim 7, wherein if it is determined that user input has been received subsequent to receiving the data associated with the plurality of data items, the method further comprises:
estimating at least an updated portion of the plurality of data items;
retrieving an updated minimum portion of the received data associated with the plurality of data items that is necessary to render an updated visual representation of the data set, the updated visual representation including the visual identifiers associated with each data item comprising the estimated updated portion of the plurality of data items; and
rendering the updated visual representation of the data set.

9. The one or more computer-storage media of claim 8, wherein if it is determined that the predetermined time period has passed since receiving the data associated with the plurality of data items, the method further comprises speculatively retrieving additional data associated with the plurality of data items that was not retrieved as part of the minimum portion.

10. The one or more computer-storage media of claim 7, wherein if it is determined that user input has not been received subsequent to receiving the data associated with the plurality of data items, it is determined whether a predetermined time period has passed since receiving the data associated with the plurality of data items.

11. A computer system for dynamically rendering a visual representation of a data set within an display area, the computer system comprising a processing unit coupled to a computer storage medium, the computer storage medium having stored thereon a plurality of computer software components executable by the processing unit, the computer software components comprising:
a data receiving module configured to receive data associated with a plurality of data items comprising the data set;
a data organizing module configured to organize two or more of the received data items, in accordance with at least one criterion, into at least two groups and to assign a common visual identifier to members of the groups, respectively;
a visual configuration module configured to determine a spatial layout of the members of the groups within the display area and to select a format of the visual identifier assigned to the members of each of the groups, respectively;
a display manager configured to perform an estimation process to identify a portion of the data set that is capable of concurrent visual display, wherein the estimation process comprises:
(a) determining a size of the display area available on a display device; and
(b) estimating the portion of the plurality of data items capable of concurrent visual display based upon a combination of the spatial layout, the visual-identifier format associated with the groups, respectively, and the size of the display area;
a data retrieval manager configured to retrieve a minimum portion of the received data necessary to render the visual representation of the estimated portion of the data set; and
a compound data display module configured to render within the single view on the display device the visual representation of the data set.

12. The computer system of claim 11, wherein the visual configuration module is further configured to determine a configuration for the visual representation of the data set.

13. The computer system of claim 12, wherein the display manager is further configured to estimate a size of the estimated portion of the plurality of data items relative to a size of the plurality of received data items, and wherein the visual configuration module comprises a position indication calculator configured to calculate at least one of a size and position of a data set position indicator based upon the estimated relative size.

14. The computer system of claim 11, wherein the display manager is further configured to determine if user input has been received subsequent to receiving the data associated with the plurality of data items, and wherein if it is determined that user input has been received subsequent to receiving the data associated with the plurality of data items, estimating at least an updated portion of the plurality of data items.

15. The computer system of claim 14, wherein the data retrieval manager is further configured to retrieve an updated minimum portion of the received data associated with the plurality of data items that is necessary to render an updated visual representation of the data set, the updated visual representation including the visual identifiers associated with each data item comprising the estimated updated portion of the plurality of data items; and wherein the compound data display component is further configured to render the updated visual representation.

16. The computer system of claim 11, wherein the data organizing module is further configured for assigning a visual representation to each of the groups, respectively, and wherein the visual representation is presented proximate to visual identifiers associated with the groups, respectively, to comprise the visual representation of the estimated portion of the data set.

17. A computerized method for rendering a visual representation of a data set, the method comprising:
  receiving data associated with a plurality of data items;
  organizing the received data items into a plurality of groups based upon at least one first criteria;
  assigning a common visual identifier to members of the groups, respectively;
  determining a spatial layout of the members of the groups within the display area;
  selecting a format of the visual identifier each of the members of the plurality of groups, respectively;
  estimating, based upon the selected visual identifiers, a portion of the visual identifiers that are capable of concurrent visual display by way of an estimation process comprising:
    (a) determining a size of a display area; and
    (b) estimating the portion of the plurality of data items capable of concurrent visual display based upon a combination of the spatial layout, the visual-identifier format associated with the groups, respectively, and the size of the display area;
  retrieving a minimum portion of the received data associated with the data items that is necessary to render the estimated portion of the visual identifiers that are capable of concurrent visual display; and
  rendering the estimated portion of the visual identifiers that are capable of concurrent visual display as the visual representation of the data set.

* * * * *